United States Patent
Sawa et al.

(10) Patent No.: US 6,965,687 B2
(45) Date of Patent: Nov. 15, 2005

(54) SIZE CHECKING METHOD AND APPARATUS

(75) Inventors: Eiji Sawa, Yokohama (JP); Hiromu Inoue, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 659 days.

(21) Appl. No.: 09/883,945

(22) Filed: Jun. 20, 2001

(65) Prior Publication Data

US 2002/0028013 A1 Mar. 7, 2002

(30) Foreign Application Priority Data

Jun. 21, 2000 (JP) .................................. 2000-186444

(51) Int. Cl.⁷ ............................................. G06K 9/00
(52) U.S. Cl. ................... 382/149; 382/199; 382/218
(58) Field of Search ................... 382/141, 144, 382/145, 147, 149, 190, 199, 209, 218

(56) References Cited

U.S. PATENT DOCUMENTS 4,392,120 A * 7/1983 Mita et al. .................. 382/199
5,680,471 A * 10/1997 Kanebako et al. .......... 382/128
6,072,897 A * 6/2000 Greenberg et al. .......... 382/144

* cited by examiner

Primary Examiner—Jon Chang
Assistant Examiner—Charles Kim
(74) Attorney, Agent, or Firm—Oblon, Spivak, McClelland, Maier & Neustadt, P.C.

(57) ABSTRACT

A pair of edges that are located at ends as viewed in the widthwise direction of a design pattern are recognized. On the basis of the edge direction in which the paired edges are recognized, edge points on the design pattern are detected as sub-pixels. The widthwise dimension of the design pattern is calculated on the basis of the edge points. In addition, the widthwise dimension of a circuit pattern is calculated at the same position as the widthwise dimension of the design pattern. On the basis of the calculated widthwise dimensions, the semiconductor wafer circuit pattern is checked.

5 Claims, 10 Drawing Sheets

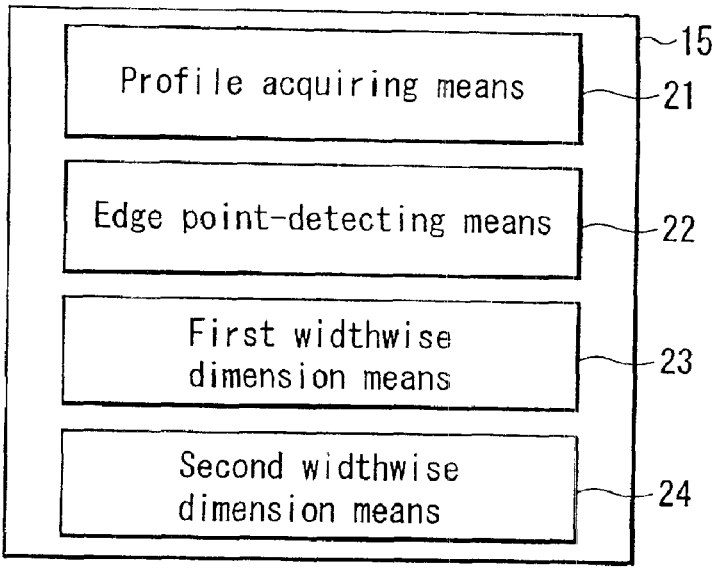
FIG. 9
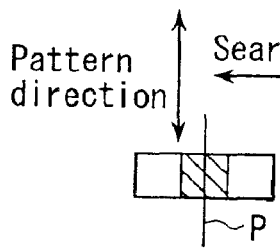
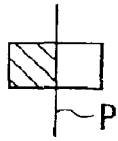
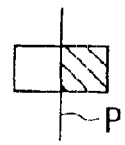
FIG. 10A    FIG. 10B    FIG. 10C
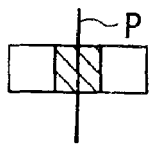
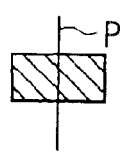
FIG. 11A      FIG. 11B
d & e & f
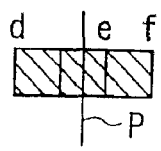
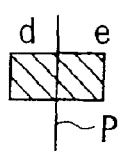
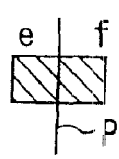
FIG. 12A    FIG. 12B    FIG. 12C

X

Y

+45

−45

+45 or −45

+22.5

+67.5

−67.5

−22.5

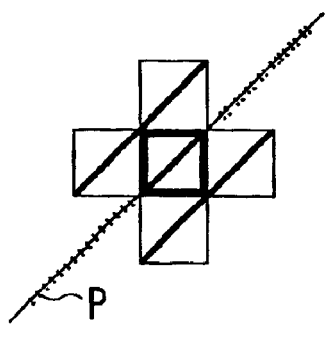 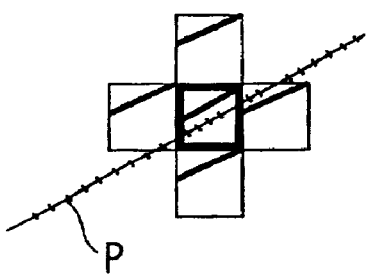 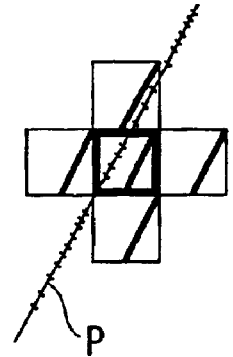
FIG. 24A  FIG. 24B  FIG. 24C
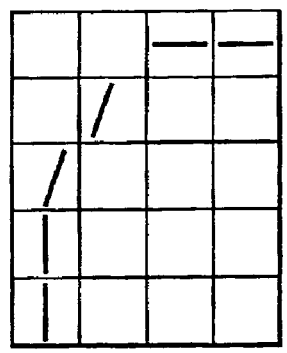
FIG. 25

SIZE CHECKING METHOD AND APPARATUS

CROSS-REFERENCE TO RELATED APPLICATIONS

This application is based upon and claims the benefit of priority from the prior Japanese Patent Application No. 2000-186444, filed Jun. 21, 2000, the entire contents of which are incorporated herein by reference.

BACKGROUND OF THE INVENTION

1. Field of the Invention

The present invention relates to mask defect inspection for semiconductor devices. In particular, the invention is directed to a size checking method and apparatus for inspecting the finished dimensions (CD: critical dimensions) of a circuit pattern formed on a mask.

2. Description of the Related Art

A size measuring technology is described, for example, in Jpn. Pat. Appln. KOKAI Publication No. 5-216996. This publication discloses a size recognition apparatus employed in an automatic figure input system.

The size recognition apparatus reads a pattern under inspection by means of an image input section, and acquires image data on that pattern. On the basis of the read image data, the apparatus divides a line segment into thin components, so as to detect the center line of the line segment. Subsequently, the thin segments are spread in the direction perpendicular to the center line, beginning with the center line, thereby measuring the width of the line segment. This width measuring method is based on counting the pixels included in the image data.

Size measuring technology is disclosed in Jpn. Pat. Appln. KOKAI Publication No. 8-54224, Published Japanese Patent 2503508 and Jpn. Pat. Appln. KOKAI Publication No. 10-284608 as well.

The circuit patterns formed on masks are miniaturized year after year. An exposure apparatus projects a circuit pattern of a mask on a semiconductor substrate, and transfers that circuit pattern to the semiconductor substrate. At the time of transfer, the mask has to be checked to see whether or not a semiconductor wafer circuit pattern is depicted accurately in accordance with a design pattern.

Even when the size measuring technology is applied, the exposure apparatus is limited in resolution, and this resolution limitation gives rise to the phenomenon wherein the measured size of a circuit pattern is smaller than the actual size of that circuit pattern. This problem becomes more marked in proportion to the size of the circuit pattern.

Under the circumstances, it is difficult to check whether or not a semiconductor wafer circuit pattern is formed accurately on a mask.

BRIEF SUMMARY OF THE INVENTION

The present invention is intended to provide a size checking method and apparatus capable of detecting the difference between the size of a pattern under inspection (e.g., a semiconductor wafer circuit pattern) and the size of a reference pattern.

A size checking method according to one major aspect of the present invention comprises: a first step of reading image data on a reference pattern and recognizing an edge direction of the reference pattern on the basis of pixel values detected at edge portions which are end portions as viewed in the width direction of the reference pattern; a second step of detecting edge points corresponding to the end portions as pixels on the basis of the pixel values detected at the edge portions; a third step of acquiring image data on a pattern under inspection; a fourth step of reading the image data on the pattern under inspection and calculating a widthwise dimension of the pattern under inspection, from edge portions located at the same position as the edge portion whose widthwise dimension is calculated by use of the reference pattern; and a fifth step of determining whether or not the pattern under inspection is defective on the basis of the widthwise dimension of the reference pattern and the widthwise dimension of the pattern under inspection.

A sixth step is further provided. In the sixth step, a frequency distribution is prepared with respect to a dimensional error obtained on the basis of the widthwise dimension of the reference pattern and the widthwise dimension of the pattern under inspection, and varying a threshold value used in the first step when the edge points are detected as sub-pixels.

The image data on the reference pattern is acquired by performing an operation on the basis of design data on the semiconductor wafer circuit pattern.

The first step includes the following sub-steps: scanning a measurement window across the reference pattern; making a search in different directions from a pixel of interest which is located inside an area of the measurement window; and detecting a search direction in which a pair of pixels are detected, on the basis of results of the search, and recognizing a direction orthogonal to the search direction as the edge direction.

The first step includes the following sub-steps: scanning a measurement window across the reference pattern; making a search in different directions from a pixel of interest which is located inside an area of the measurement window, the different directions being an X direction, a Y direction orthogonal to the X direction, directions which form angles of ±45° with reference to the X direction, and directions which form angles of ±45° with reference to the Y direction; and detecting a search direction in which a pair of pixels are detected, on the basis of results of the search, and recognizing a direction orthogonal to the search direction as the edge direction.

The first step includes the following sub-steps: scanning a measurement window across the reference pattern; making a search in different directions from a pixel of interest which is located inside an area of the measurement window, the different directions being an X direction, a Y direction orthogonal to the X direction, directions which form angles of ±45° with reference to the X direction, directions of bisectors between each of these directions and the X and Y directions, directions which form angles of ±45° with reference to the Y direction, and directions of bisectors between each of these directions and the X and Y directions; and detecting a search direction in which a pair of pixels are detected, on the basis of results of the search, and recognizing a direction orthogonal to the search direction as the edge direction.

The second step includes the following sub-steps: preparing a profile showing how pixel values are distributed in the width direction of the reference pattern, the pixel values corresponding to the edge portion whose edge direction is recognized, and detecting edge points as sub-pixels using a predetermined threshold value with respect to the profile.

The pattern under inspection is a semiconductor wafer circuit pattern formed on a mask used in exposure processing.

The fourth step includes the following sub-steps: recognizing the edge direction of the pattern under inspection, on the basis of pixel values detected at each of edge portions which are end portions as viewed in the width direction of the reference pattern, the edge direction being recognized with respect to the edge portions located at the same position as the edge portion whose widthwise dimension is calculated by use of the reference pattern; and detecting edge points of both ends as sub-pixels on the basis of the pixel values at each edge portion, and calculating the widthwise dimension of the pattern under inspection, with the edge points as starting points.

The fifth step includes the following sub-steps: calculating a dimensional error on the basis of the difference between the widthwise dimension of the pattern under inspection and the widthwise dimension of the reference pattern; and determining an abnormal state when a value obtained by adding an offset value to the dimensional error is out of an allowable range.

The fifth step includes the following sub-steps: calculating a dimensional error on the basis of the difference between the widthwise dimension of the pattern under inspection and the widthwise dimension of the reference pattern; and determining an abnormal state when a value obtained by adding an offset value to the dimensional error is out of an allowable range, and the sixth step includes the following sub-steps: preparing a frequency distribution with respect to the dimensional error; and varying the offset value or a threshold value which is that of either the reference pattern or the pattern under inspection, and which used in the second step when the edge points are detected as sub-pixels, on the basis of the frequency distribution.

A size checking method according to another major aspect of the present invention comprises: acquiring a reference pattern by performing an operation on the basis of design data on the semiconductor wafer circuit pattern; scanning a measurement window across image data on the reference pattern; making a search in different directions from a pixel of interest which is located inside an area of the measurement window, the different directions being an X direction, a Y direction orthogonal to the X direction, directions which form angles of ±45° with reference to the X direction, and directions which form angles of ±45° with reference to the Y direction; detecting a search direction in which a pair of pixels are detected, on the basis of results of the search, and recognizing a direction orthogonal to the search direction as an edge direction of the reference pattern; preparing a profile showing how pixel values are distributed in the width direction of the reference pattern, the pixel values corresponding to a pair of pixels whose edge direction is recognized; detecting edge points corresponding to ends of the reference pattern as sub-pixels using a predetermined threshold value with respect to the profile; calculating a widthwise dimension of the reference pattern from the edge points; acquiring image data on the pattern under inspection, the pattern being a semiconductor wafer circuit pattern formed on a mask used by an exposure apparatus; calculating a widthwise dimension of the reference pattern at the same position as a pair of pixels whose widthwise dimension is calculated by use of the reference pattern; calculating a dimensional error on the basis of the difference between the widthwise dimension of the pattern under inspection and the widthwise dimension of the reference pattern; determining an abnormal state when a value obtained by adding an offset value to the dimensional error is out of an allowable range; preparing a frequency distribution with respect to the dimensional error; and varying the offset value or a threshold value which is that of either the reference pattern or the pattern under inspection, on the basis of the frequency distribution.

A size checking apparatus according to one major aspect of the present invention comprises: pattern recognition means for reading image data on a reference pattern and recognizing an edge direction of the reference pattern on the basis of pixel values detected at edge portions which are end portions as viewed in the width direction of the reference pattern; first size-measuring means for detecting edge points corresponding to the end portions as sub-pixels on the basis of the pixel values detected at the edge portions, and for calculating a widthwise dimension of the reference pattern, from the edge points as starting points; means for acquiring image data on the pattern under inspection; second size-measuring means for reading the image data on the pattern under inspection and for calculating a widthwise dimension of the pattern under inspection, from edge portions located at the same position as the edge portion whose widthwise dimension is calculated by use of the reference pattern; and means for determining whether or not the pattern under inspection is defective on the basis of the widthwise dimension of the reference pattern and the widthwise dimension of the pattern under inspection.

Threshold value-varying means is provided. The threshold value-varying means prepares a frequency distribution with respect to the dimensional error of the reference pattern and, on the basis of the frequency distribution, varies a threshold value which the first size-measuring means uses when the edge points are detected as sub-pixels.

Data expansion means is provided. The data expansion means acquires image data on the reference pattern by performing an operation on the basis of design data on the semiconductor wafer circuit pattern.

The pattern recognition means includes: means for scanning a measurement window across the reference pattern; means for making a search in different directions from a pixel of interest which is located inside an area of the measurement window; and means for detecting a search direction in which a pair of pixels are detected, on the basis of results of the search; and means for recognizing a direction orthogonal to the search direction as the edge direction.

The pattern recognition means includes: means for scanning a measurement window across the reference pattern; means for making a search in different directions from a pixel of interest which is located inside an area of the measurement window, the different directions being an X direction, a Y direction orthogonal to the X direction, directions which form angles of ±45° with reference to the X direction, and directions which form angles of ±45° with reference to the Y direction; and means for detecting a search direction in which a pair of pixels are detected, on the basis of results of the search, and for recognizing a direction orthogonal to the search direction as the edge direction.

The pattern recognition means includes: means for scanning a measurement window across the reference pattern; means for making a search in different directions from a pixel of interest which is located inside an area of the measurement window, the different directions being an X direction, a Y direction orthogonal to the X direction, directions which form angles of ±45° with reference to the X direction, directions of bisectors between each of these directions and the X and Y directions, directions which form angles of ±45° with reference to the Y direction, and directions of bisectors between each of these directions and the X and Y directions; and means for detecting a search direction in which a pair of pixels are detected, on the basis of results of the search, and for recognizing a direction orthogonal to the search direction as the edge direction.

The first size-measuring means prepares a profile showing how pixel values are distributed in the width direction of the reference pattern, the pixel values corresponding to the edge portion whose edge direction is recognized. Then, the first size-measuring means detects edge points as sub-pixels using a predetermined threshold value with respect to the profile.

The pattern under inspection is a semiconductor wafer circuit pattern formed on a mask used by an exposure apparatus.

The means for acquiring the image data on the pattern under inspection is provided with: an exposure apparatus having a mask on which a semiconductor wafer circuit pattern is formed; imaging means for imaging a mask image projected by the exposure apparatus; and image processing means for deriving image data from image signals output from the imaging means.

The dimensional error determination means is provided with: means for calculating a dimensional error on the basis of the difference between the widthwise dimension of the pattern under inspection and the widthwise dimension of the reference pattern; and means for determining an abnormal state when a value obtained by adding an offset value to the dimensional error is out of an allowable range.

The dimensional error determination means is provided with: means for calculating a dimensional error on the basis of the difference between the widthwise dimension of the pattern under inspection and the widthwise dimension of the reference pattern; and means for determining an abnormal state when a value obtained by adding an offset value to the dimensional error is out of an allowable range. In addition, the threshold value-varying means for varying the threshold value of the reference pattern or the pattern to be generated is provided with: means for preparing a frequency distribution with respect to a dimensional error and, on the basis of the frequency distribution, varying a threshold value which is used in the second step when the edge points are detected as sub-pixels.

A size checking apparatus according to one major aspect of the present invention comprises: data expansion means for acquiring a reference pattern by performing an operation on the basis of design data on a semiconductor wafer circuit pattern; scanning means for scanning a measurement window across image data on the reference pattern; search means for making a search in different directions from a pixel of interest which is located inside an area of the measurement window, the different directions being an X direction, a Y direction orthogonal to the X direction, directions which form angles of ±45° with reference to the X direction, and directions which form angles of ±45° with reference to the Y direction; and edge direction recognition means for detecting a search direction in which a pair of pixels are detected, on the basis of results of the search, and for recognizing a direction orthogonal to the search direction as the edge direction; profile acquiring means for preparing a profile showing how pixel values are distributed in the width direction of the reference pattern, the pixel values corresponding to the edge portion whose edge direction is recognized; edge point-detecting means for detecting edge points corresponding to end portions of the reference pattern as sub-pixels using a predetermined threshold value with respect to the profile; first widthwise dimension means for calculating a widthwise dimension of the reference on the basis of the edge points; an exposure apparatus having a mask on which a semiconductor wafer circuit pattern is formed; imaging means for imaging a mask image projected by the exposure apparatus; image processing means for deriving image data on the pattern under inspection, from image signals output from the imaging means; second widthwise dimension means for receiving the image data acquired by the image processing means and for calculating a widthwise dimension of the pattern under inspection, at the same position as a pair of pixels detected by the edge direction recognition means; dimensional error calculating means for calculating a dimensional error on the basis of the difference between the widthwise dimension of the pattern under inspection and the widthwise dimension of the reference pattern; determination means for determining an abnormal state when a value obtained by adding an offset value to the dimensional error is out of an allowable range; frequency distribution-preparing means for preparing a frequency distribution with respect to the dimensional error; and varying means for varying the offset value or a threshold value which is that of either the reference pattern or the pattern under inspection, on the basis of the frequency distribution.

According to the present invention, the size of a pattern, such as a semiconductor wafer circuit pattern, can be checked accurately.

According to the present invention, moreover, either an offset value or a threshold value of a reference pattern or a pattern under inspection, can be varied on the basis of the frequency distribution prepared from a dimensional error. Even if a circuit pattern may vary in shape in the process of generating design data from a design database that stores data on semiconductor wafer circuit patterns, the size of the pattern under inspection (e.g., the semiconductor wafer circuit pattern) can be checked accurately.

Therefore, miniaturized circuit patterns can be formed on a semiconductor wafer by executing an exposure operation by use of the inspected mask.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a function block diagram illustrating a size measuring means that is employed in the size checking apparatus of the first embodiment of the present invention.

FIG. 10A shows a combination of edge pairs used for detecting edge points in the size checking apparatus of the first embodiment of the present invention.

FIG. 10B shows a combination of edge pairs used for detecting edge points in the size checking apparatus of the first embodiment of the present invention.

FIG. 10C shows a combination of edge pairs used for detecting edge points in the size checking apparatus of the first embodiment of the present invention.

FIG. 11A shows a combination of edge pairs used for detecting edge points in the size checking apparatus of the first embodiment of the present invention.

FIG. 11B shows a combination of edge pairs used for detecting edge points in the size checking apparatus of the first embodiment of the present invention.

FIG. 12A shows a combination of edge pairs used for detecting edge points in the size checking apparatus of the first embodiment of the present invention.

FIG. 12B shows a combination of edge pairs used for detecting edge points in the size checking apparatus of the first embodiment of the present invention.

FIG. 12C shows a combination of edge pairs used for detecting edge points in the size checking apparatus of the first embodiment of the present invention.

FIG. 24A is a schematic diagram showing a template of a combination of edge pairs used in the size checking apparatus of the second embodiment of the present invention.

FIG. 24B is a schematic diagram showing a template of a combination of edge pairs used in the size checking apparatus of the second embodiment of the present invention.

FIG. 24C is a schematic diagram showing a template of a combination of edge pairs used in the size checking apparatus of the second embodiment of the present invention.

FIG. 25 is a schematic diagram showing how an edge direction is recognized by the size checking apparatus of the second embodiment of the present invention.

DETAILED DESCRIPTION OF THE INVENTION

The first embodiment of the present invention will now be described with reference to the accompanying drawings.

Figures 1, 2:
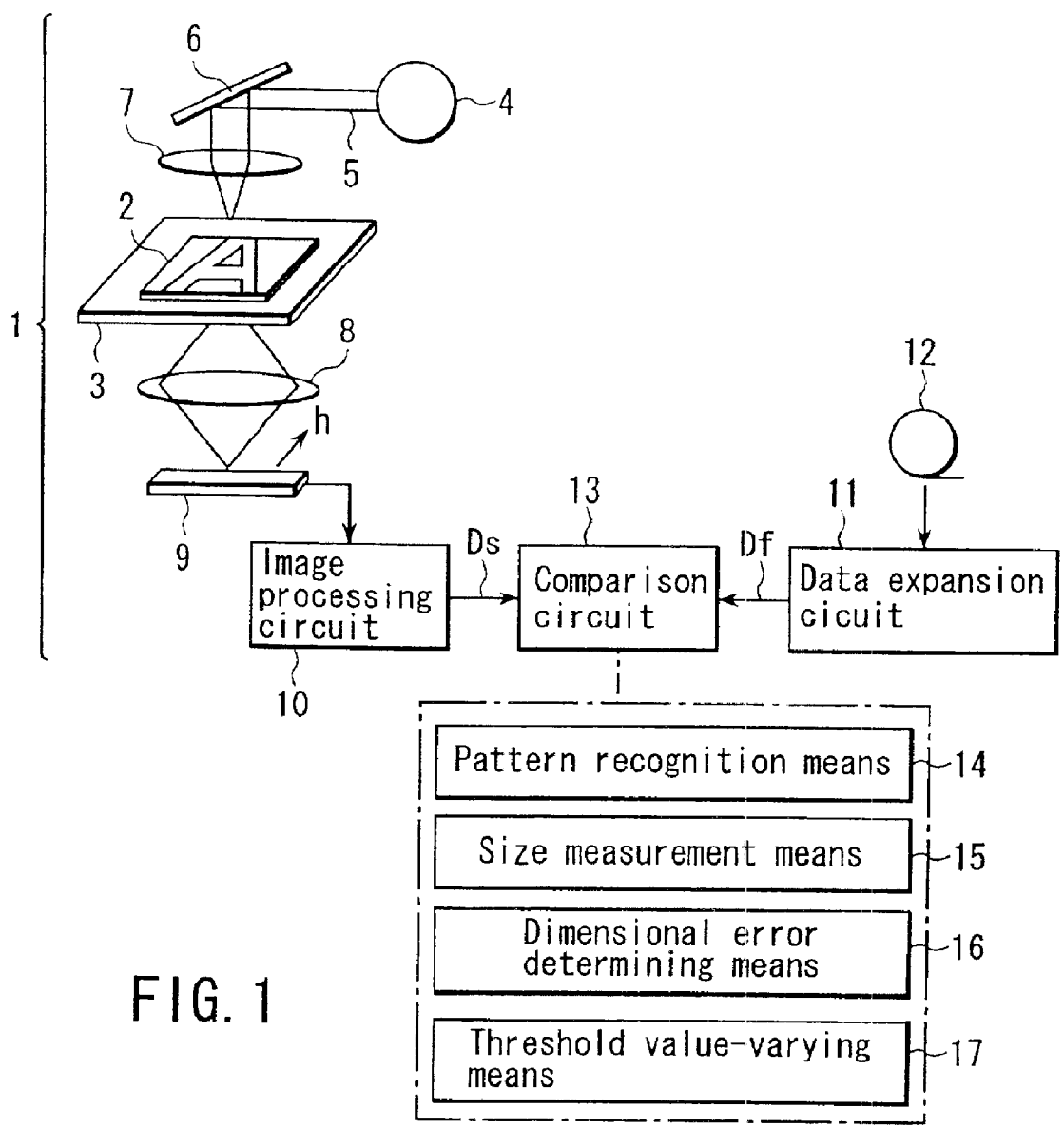
FIG. 1 is a structural view of a size checking apparatus according to the first embodiment of the present invention.
FIG. 2 is a schematic diagram showing how a measurement window is scanned across design pattern data in the size checking apparatus of the first embodiment.

FIG. 1 is a structural view of a size checking apparatus according to the first embodiment of the present invention. The size checking apparatus is used in the photolithography step of a semiconductor wafer manufacturing process. This size checking apparatus checks the size a semiconductor wafer circuit pattern which is formed on a mask 2 employed by an exposure apparatus 1. The semiconductor wafer circuit pattern is a pattern under inspection.

In the exposure apparatus 1, a mask 2 is placed on a table 3. A semiconductor wafer circuit pattern is formed on the mask 2. An illumination system 4 emits illumination light 5 used for exposure processing.

A reflecting mirror 6 and a condenser lens 7 are arranged in the optical path of the illumination light 5. The illumination light 5 is first reflected by the mirror 6 and is then guided onto the mask 2 by the condenser lens 7.

An objective lens 8 is arranged in the optical path of pattern light, i.e., the light not shielded by the mask 2. In ordinary exposure processing, a semiconductor wafer is located at the projection position of the objective lens 8, and the circuit pattern is transferred from the mask 2 to the semiconductor wafer.

To check the size of the circuit pattern formed on the mask, the size checking apparatus of the present invention is provided with an image sensor 9. The image sensor 9 is a line sensor made of a CCD, for example. The image sensor 9 acquires a projection image of the circuit pattern from the mask 2 while moving in the direction h, as shown in FIG. 2.

An image processing circuit 10 has a function of receiving image signals output from the image sensor 9 and processing the image signals to acquire projection image data Ds on the circuit pattern formed on the mask 3. The projection image data Ds is image data regarding a pattern under inspection. The projection image data Ds will be hereinafter referred to as "under-inspection pattern data Ds."

A data expansion circuit 11 has a function of receiving design data 12 on the semiconductor wafer circuit pattern and executing an arithmetic operation based on the design data, to thereby prepare image data Df on a design pattern. The image pattern Df will be hereinafter referred to as "design pattern data Df."

Figure 3:
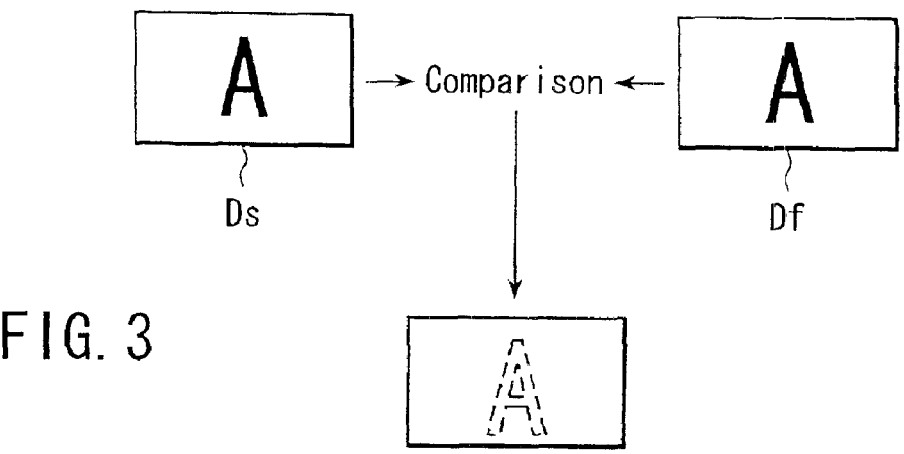
FIG. 3 is a schematic diagram illustrating the operation of a comparison circuit that is employed in the size checking apparatus of the first embodiment of the present invention.

As shown in FIG. 3, a comparison circuit 13 has a function of comparing the under-inspection pattern data Ds with the design pattern data Df and determining the quality of the circuit pattern formed on the mask 2. The comparison circuit 13 has a number of functions and includes a pattern recognition means 14, a size measurement means 15, a dimensional error determining means 16 and a threshold value-varying means 17.

The pattern recognition means 14 differentiates the design pattern data Df and determines an edge direction of the design pattern represented by the design pattern data Df. The pattern recognition means 14 has a function of searching for a pair of adjacent pixels (hereinafter referred to as an edge pair) at each of edge portions, which are end portion as viewed in the width direction of the design pattern represented by the design pattern data Df, and determining the edge direction of the design pattern.

Figure 4:
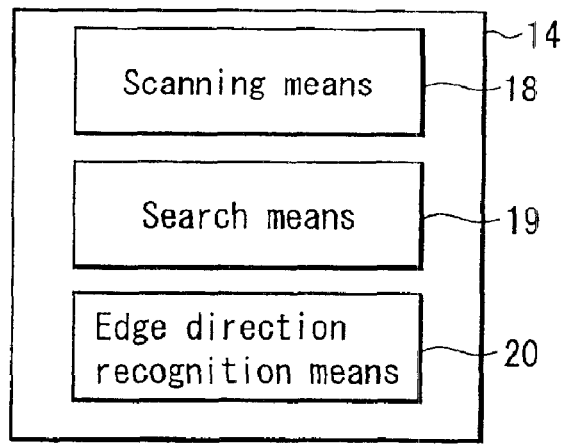
FIG. 4 is a function block diagram illustrating a pattern recognition means that is employed in the size checking apparatus of the first embodiment of the present invention.

To be more specific, the pattern recognition means 14 has a number of functions and includes a scanning means 18, a search means 19 and an edge direction recognition means 20, as shown in FIG. 4.

Figure 5:
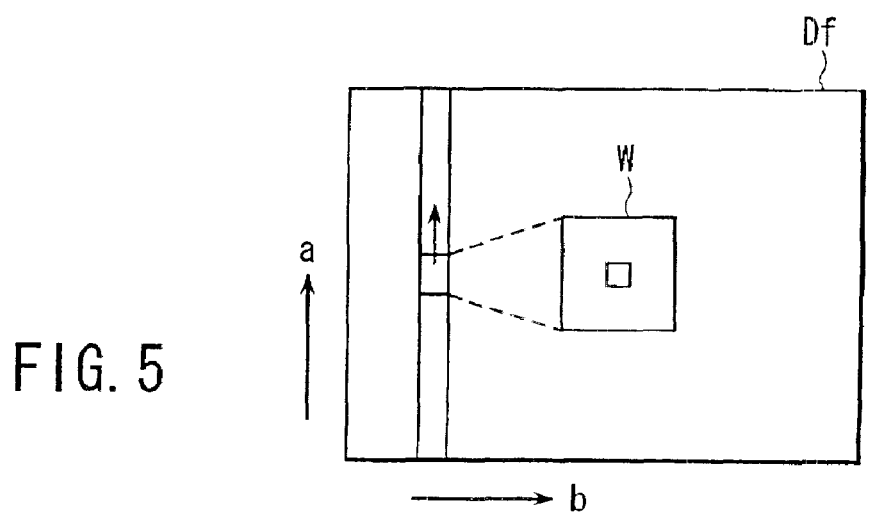
FIG. 5 shows how the measurement window is scanned in the size checking apparatus of the first embodiment of the present invention.

As shown in FIG. 5, the scanning means 18 drives a measurement window W over the design pattern data Df in the scan direction a.

P denotes the design pattern represented by the design pattern data Df. The design pattern P has a black level and is indicated by the oblique lines in the FIG. The regions surrounding the design pattern P have a white level.

The scanning means 18 scans the measurement window W in the scan direction a. In addition, the scanning means 18 shifts the measurement window W in b direction, So as to scan the entirety of the design pattern data D.

The measurement window W is comprised of N×N pixels. The "N×N pixels" is specifically 15×15 pixels, 17×17 pixels, 19×19 pixels, or the like.

Figure 6:
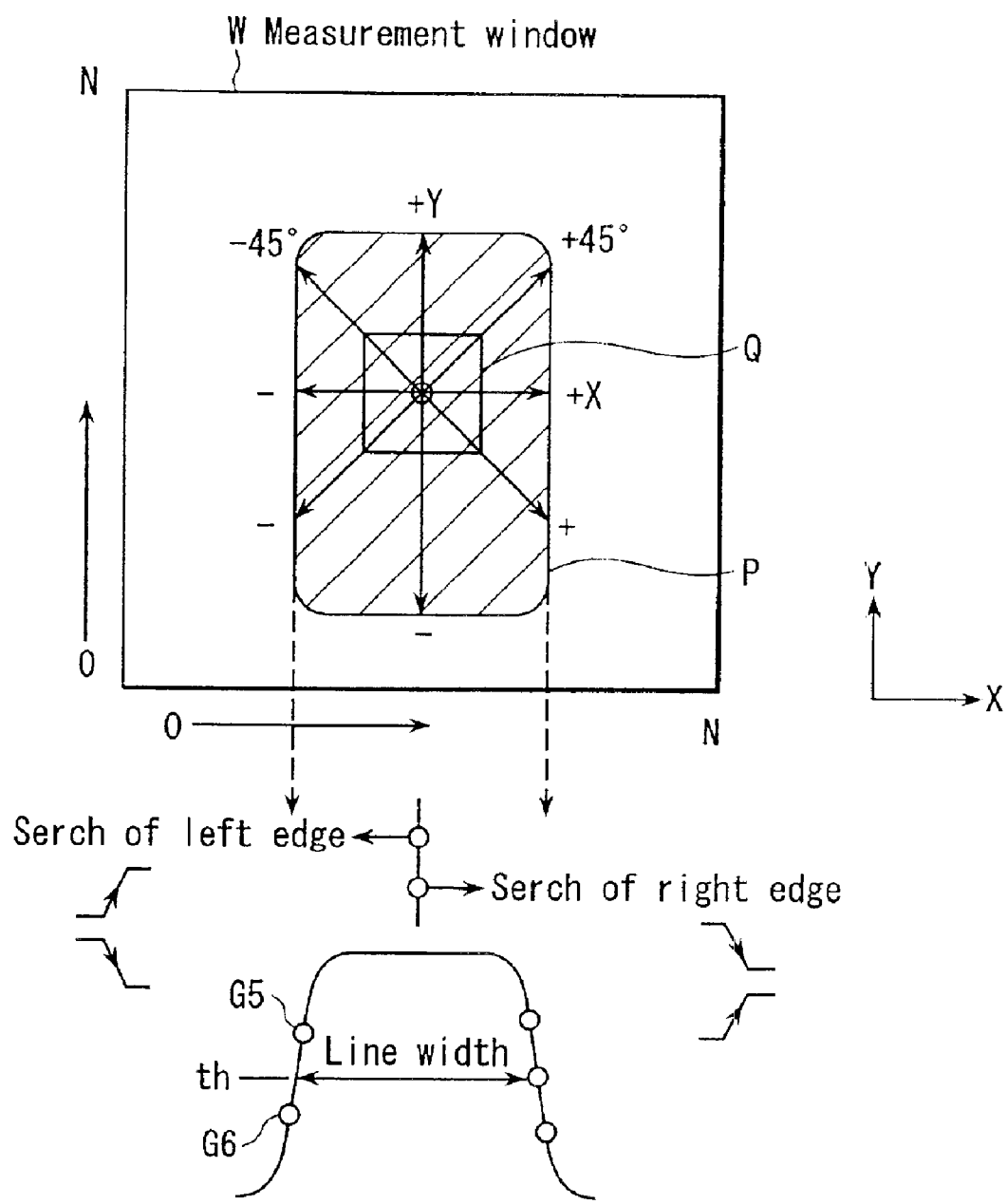
FIG. 6 shows how a search operation is carried out within the measurement window in the size checking apparatus of the first embodiment of the present invention.

As shown in FIG. 6, the search means includes a pixel of interest Q located within the area of the measurement window W. The pixel of interest is the center pixel of the measurement window W.

The search means has a function of making a search from the pixel of interest Q in different directions, which include an X direction, a Y direction orthogonal to the X direction, and four directions which form angles of ±45° with reference to the X and Y directions.

Figure 7:
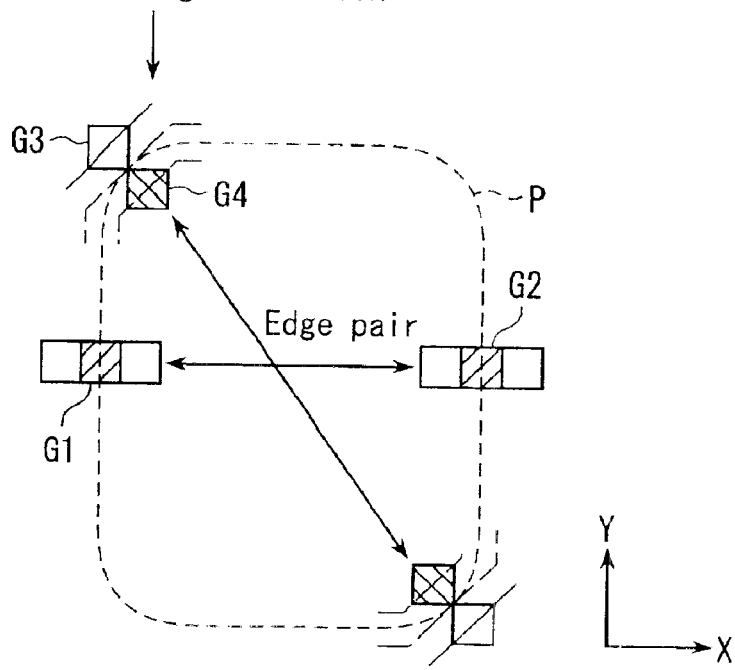
FIG. 7 is a schematic diagram showing how an edge pair is in the size checking apparatus of the first embodiment of the present invention.

On the basis of the results of a search made in the eight directions, the edge direction recognition means 20 detects a search direction in which a pair of pixels (hereinafter referred to as an edge pair) is detectable, as shown in FIG. 7. The edge direction recognition means 20 recognizes that an edge of the design pattern extends in the direction orthogonal to the search direction.

The edge direction recognition means 20 makes a search in a direction in which an edge pair is detectable. For example, the edge direction recognition means makes the search in the X direction, as shown in FIG. 7. When pixels G1 and G2 are detected at the edge points which are at the ends of the design pattern P, these pixels G1 and G2 are detected as an edge pair. The direction (Y direction) orthogonal to the search direction (X direction) is recognized as the edge direction of the pattern P.

When the edge pair made up of pixels G3 and G4 is detected, the design pattern P is recognized as being inclined by ±45°.

The size measurement means 15 detects the edge points which are at the ends of the design pattern P, as sub-pixels on the basis of the pixel values of the edge pair detected by the edge direction recognizing means 20. The size measurement means 15 has a function of calculating the widthwise dimension Rd of the design pattern P on the basis of the edge points.

Figure 8:
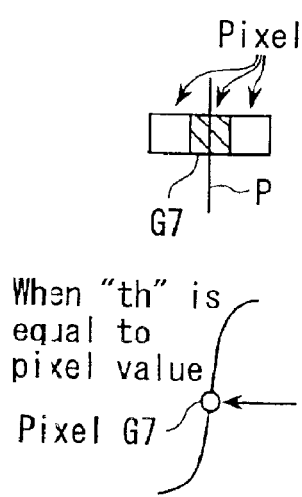
FIG. 8 illustrates how edge points are detected in the size checking apparatus of the first embodiment of the present invention.
Figure 8:
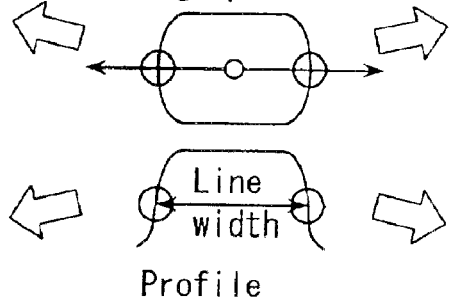
Figure 8:
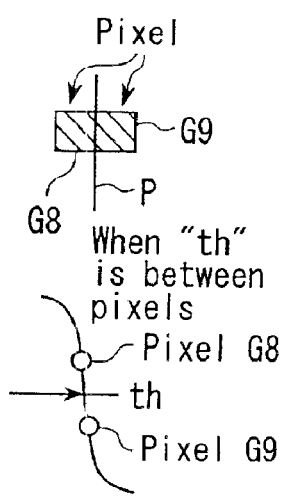
Figure 13A:
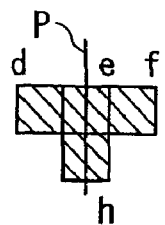
FIG. 13A shows a combination of edge pairs used for detecting edge points in the size checking apparatus of the first embodiment of the present invention.
Figure 13B:
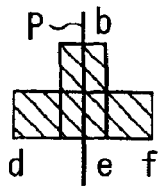
FIG. 13B shows a combination of edge pairs used for detecting edge points in the size checking apparatus of the first embodiment of the present invention.
Figure 13C:
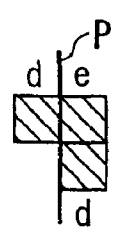
FIG. 13C shows a combination of edge pairs used for detecting edge points in the size checking apparatus of the first embodiment of the present invention.
Figure 13D:
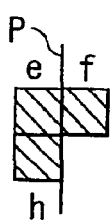
FIG. 13D shows a combination of edge pairs used for detecting edge points in the size checking apparatus of the first embodiment of the present invention.
Figure 13E:
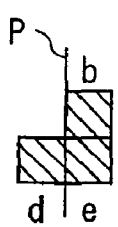
FIG. 13E shows a combination of edge pairs used for detecting edge points in the size checking apparatus of the first embodiment of the present invention.
Figure 13F:
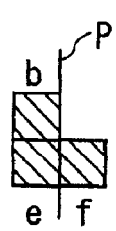
FIG. 13F shows a combination of edge pairs used for detecting edge points in the size checking apparatus of the first embodiment of the present invention.

As shown in FIGS. 6 and 8, the size measurement means 15 checks the pixel values of the design pattern P at positions where the edge direction is recognized, and detects the profile of the pixel values in the widthwise direction of the design pattern P. By applying a predetermined threshold value "th" to that profile, edge points are detected based on the sub-pixels.

As shown in FIG. 6, when the profile is processed using threshold value "th", the sub-pixel located between the pixels G5 and G6 of the adjacent edge pairs is calculated as follows:

$$(\text{Sub-Pixel Position}) = (G5 - th)/(G5 - G6) \quad (1)$$

The size measurement means 15 has a function of reading the under-inspection pattern data Ds and calculating widthwise dimension Sd of the pattern under inspection, using edge portions located at the same position as the edge portions based on which the widthwise dimension of the design pattern P is calculated.

To be more specific, the size measurement means 15 has a number of functions and includes a profile acquiring means 21, an edge point-detecting means 22, a first widthwise dimension means 23, and a second widthwise dimension means 24.

The profile acquiring means 21 has a function of acquiring a profile representing how pixel values are in the width direction of the design pattern P at an edge portion whose edge direction has been recognized.

The edge point-detecting means 22 has a function of detecting edge points located at ends of the design pattern as sub pixels. These edge points are detected by applying a predetermined threshold to the profile obtained by the profile acquiring means.

The first widthwise dimension means 23 has a function of calculating widthwise dimensions of the design pattern P on the basis of the edge points detected by the edge point-detecting means.

The second widthwise dimension means 24 is supplied with under-inspection pattern data Ds. It has a function of calculating the widthwise dimension of a circuit pattern of the under-inspection pattern Ds at the same position as the pixels of the edge pair detected by the edge direction recognizing means.

The edge point-detecting means 22 detects edge points as follows:

An edge point is a point where the pixel value changes from "200" (which represents black in the drawings) to "0" (which represents white in the drawings).

As shown in FIG. 6, an edge point is detected using a threshold value "th." In the detection of an edge point, the two cases shown in FIG. 8 have to be taken into consideration: one is case 1 where the brightness of pixel G7 is equal to the threshold value "th", and the other is case 2 where threshold value "th" is between the brightnesses of pixels G8 and G9.

In the edge point detection, a number of combinations of edge pairs have to be considered. These edge pair combinations are stored as templates, each made up of opposing edge-surrounding pixels. When edge patterns at two edges are detected as opposing patterns of a similar kind, they are recognized as an edge pair.

FIGS. 10A to 10C show edge pairs wherein the pattern direction of a pixel adjacent to an edge is orthogonal to the size measurement direction (the pattern width direction). Upon detection of one of these edge pairs, the edge point-detecting means 22 an edge point of the design pattern P.

FIGS. 11A and 11B show edge-direction patterns wherein the pattern direction of one or two pixels adjacent to the edge is orthogonal to the size measurement direction. When one of the edge-direction patterns is detected, the edge point-detecting means 22 detects an edge point of the design pattern P on the basis of the detected edge-direction pattern.

FIGS. 12A to 12C show edge-direction patterns wherein the pattern direction of two or three pixels adjacent to the edge is orthogonal to the size measurement direction. When one of the edge-direction patterns is detected, the edge point-detecting means 22 detects an edge point of the design pattern P on the basis of the detected edge-direction pattern.

FIGS. 13A to 13F show edge-direction patterns wherein the pattern direction of three or four pixels adjacent to the edge is orthogonal to the size measurement direction. When one of the edge-direction patterns is detected, the edge point-detecting means 22 detects an edge point of the design pattern P on the basis of the detected edge-direction pattern.

Figure 14A:
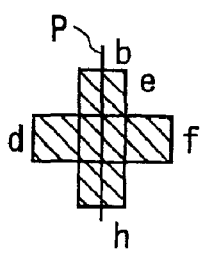
FIG. 14A shows a combination of edge pairs used for detecting edge points in the size checking apparatus of the first embodiment of the present invention.
Figure 14B:
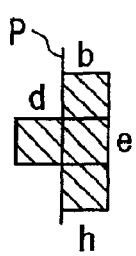
FIG. 14B shows a combination of edge pairs used for detecting edge points in the size checking apparatus of the first embodiment of the present invention.
Figure 14C:
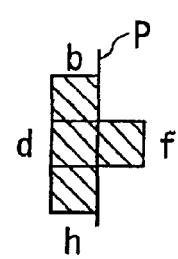
FIG. 14C shows a combination of edge pairs used for detecting edge points in the size checking apparatus of the first embodiment of the present invention.

FIGS. 14A to 14C show edge-direction patterns wherein the pattern direction of four or five pixels adjacent to the edge is orthogonal to the size measurement direction. When one of the edge-direction patterns is detected, the edge point-detecting means 22 detects an edge point of the design pattern P on the basis of the detected edge-direction pattern.

Figure 15:
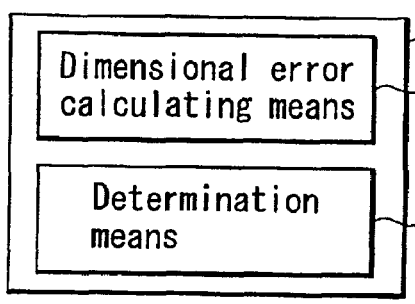
FIG. 15 is a function block diagram of a dimensional error determination means that is employed in the size checking apparatus of the first embodiment of the present invention.

The size measurement means 15 calculates the widthwise dimension Rd of the design pattern P and the widthwise dimension Sd of the pattern under inspection. Based on these widthwise dimensions, the dimensional error determining means 16 determines the quality of the semiconductor wafer circuit pattern. To be more specific, the dimensional error determining means 16 has functions corresponding to a dimensional error calculating means 25 and a determination means 26, as shown in FIG. 15.

On the basis of the difference between the widthwise dimension Rd of the design pattern P and the widthwise dimension Sd of the pattern under inspection, the dimensional error calculating means 25 calculates a dimensional error "err" (a CD error) as follows:

$$\text{err} = Sd - Rd \quad (2)$$

The determination means 26 has a function of determining that the semiconductor wafer circuit pattern is abnormal if a value obtained by adding an offset value to the dimensional error "err" is out of an allowable range, i.e., if that value is greater than the upper limit or smaller than the lower limit.

The dimensional error "err" may be calculated in the following alternative method.

If, as shown in FIG. 7, pixels G1 and G2 of the design pattern are detected as an edge pair, pixel G1 is processed as part of the first edge, and pixel G2, as part of the second edge.

Let us assume that an edge point detected on the first edge is denoted by "rsub1" and an edge point detected on the second edge is denoted by "rsub2."

Let us also assume that in a pattern under inspection, first and second edge points located on the same positions as the first and second edges of the design pattern P are denoted by "ssub1" and "rsub2", respectively.

In this case, a dimensional error "err" is calculated as follows:

"err"=(ssub2−ssub1)−(rsub2−rsub1)   (3)

The threshold value-varying means prepares a frequency distribution of the dimensional error "err" and varies or determines the threshold value or offset value on the basis of the frequency distribution. The threshold value or offset value is varied because if it is left as it is, adverse effects may be brought about in the calculation process of a data expansion circuit 11. For example, the design pattern data Df may include an error, a pattern under inspection may decrease in shape, depending upon the color (black or white) of the background, and the data to be processed may become non-linear in accordance with a decrease in shape. To avoid these, the threshold value or offset value must be adjusted.

Figure 16:
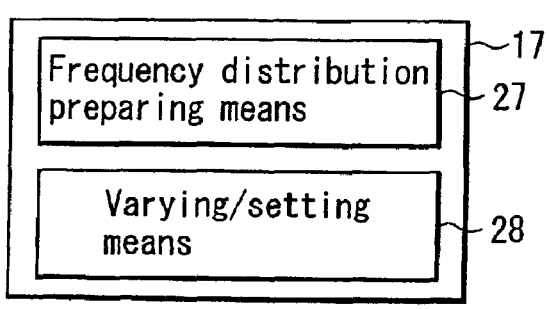
FIG. 16 is a function block diagram of a threshold value-varying means that is employed in the size checking apparatus of the first embodiment of the present invention.

As shown in FIG. 16, the threshold value-varying means 17 has functions corresponding to a frequency distribution preparing means 27 and a varying/setting means 28.

Figure 17:
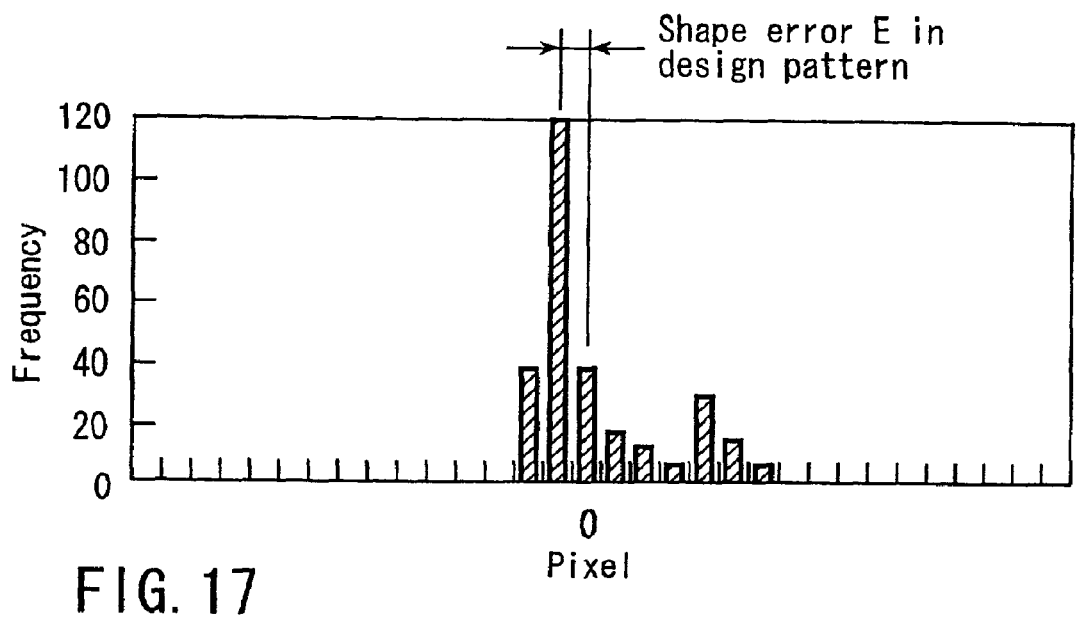
FIG. 17 is a frequency distribution chart showing how often a dimensional error occurs in a designed pattern in the size checking apparatus of the first embodiment of the present invention.

As shown in FIG. 17, the frequency distribution preparing means 27 prepares a frequency distribution of the dimensional error "err" between the design pattern P and the pattern under inspection.

The varying/setting means 28 varies or determines the threshold value or offset value on the basis of the frequency distribution prepared by the frequency distribution preparing means 27.

Figure 18:
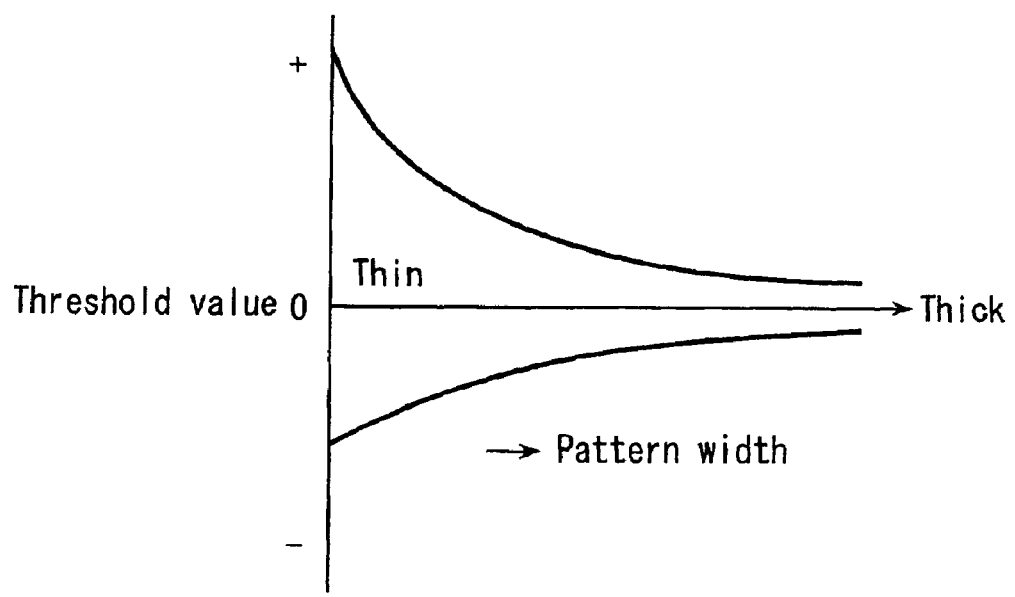
FIG. 18 shows how a threshold value is related to design pattern dimensions in the size checking apparatus according to the first embodiment of the present invention.
Figure 19:
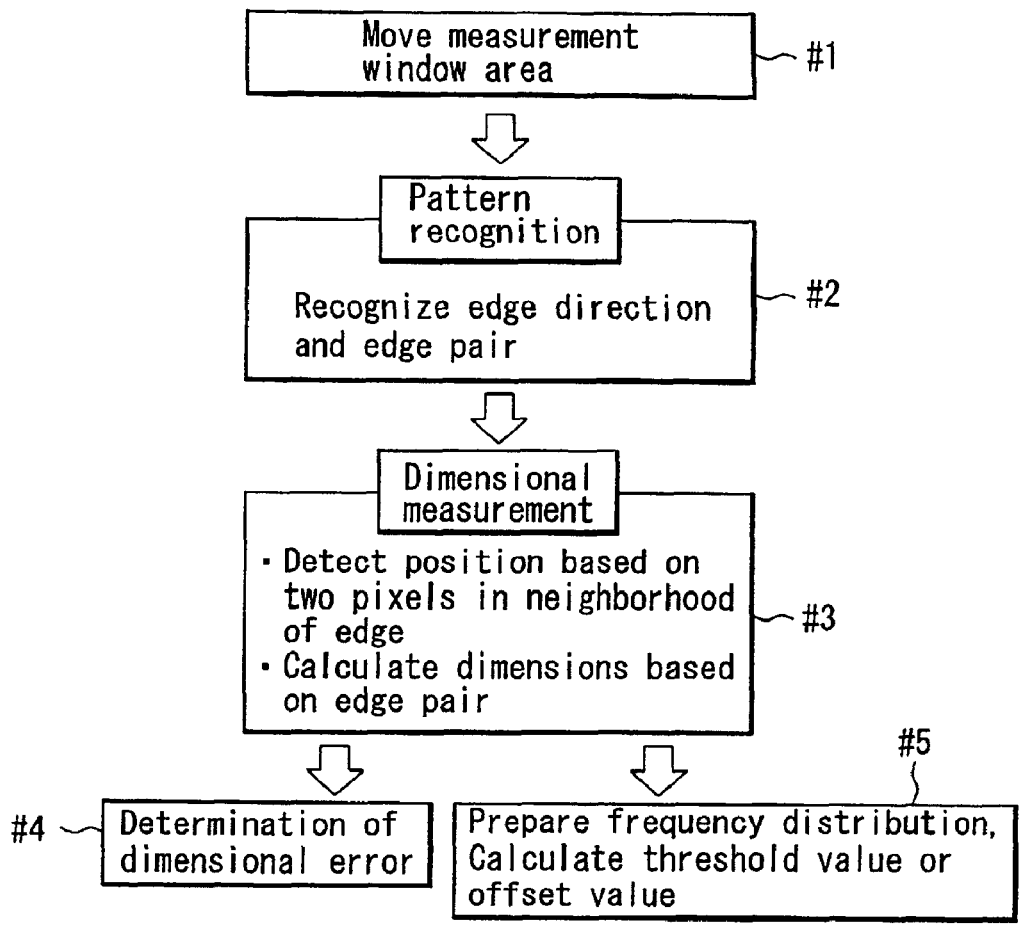
FIG. 19 is an operational flowchart illustrating a comparison circuit that is employed in the size checking apparatus of the first embodiment of the present invention.

As shown in FIG. 18, the threshold value must be increased in accordance with a decrease in the line width of the circuit pattern formed on the mask or in accordance with a decrease in the size of a contact pattern.

The size measurement means 15 measures the size of a circuit pattern. Then, the threshold value-varying means 17 prepares a frequency distribution of dimensional error "err", such as that shown in FIG. 17, by using circuit patterns formed with a normal mask 2.

The design pattern P represented by the design pattern data Df may vary in position, depending upon the color (black/white) of the background. The threshold value-varying means 17 is therefore provided with a function of determining a plurality of offset values in accordance with the levels of the background.

From the frequency distribution of dimensional errors "err" shown in FIG. 17, it is possible to know variations corresponding to the line width of a circuit pattern. Hence, the threshold value-varying means 17 is provided with a function of determining a plurality of threshold values in accordance with the size (pattern width) of the design pattern P shown in FIG. 18.

A description will be given as to how the apparatus described above operates.

The mask 2 is placed on the table 3 of the exposure apparatus 1.

The illumination system 4 emits illumination light 5. The illumination light 5 is reflected by the reflecting mirror 6 and falls on the mask 2 after passing through the condenser lens 7.

As shown in FIG. 2, the image sensor 9 acquires an image of the projection image of the circuit pattern formed on the mask 2, while simultaneously moving in the direction h. The image sensor 9 outputs image signals corresponding to the projection image.

The image processing circuit 10 receives signals output from the image sensor 9 and processes the image signals to acquire projection image data Ds on the circuit pattern formed on the mask 3, namely under-inspection pattern data Ds.

The data expansion circuit 11 receives the design data 12 on the semiconductor wafer circuit pattern and executes an arithmetic operation based on the design data, to thereby prepare image data Df on a design pattern, namely design pattern data Df.

As shown in FIG. 3, the comparison circuit 13 compares the under-inspection pattern data Ds with the design pattern data Df and determines the quality of the circuit pattern formed on the mask 2.

The operation of the comparison circuit will be described, referring to the flowchart shown in FIG. 3.

First of all, the scanning means 18 of the pattern recognition means 15 executes step #1. As shown in FIG. 1, in step #1, the measurement window W is scanned across the design pattern data Df in the scan direction a. The scan position is shifted in b direction, thereby scanning the entirety of the design pattern data Df.

Next, the search means 19 executes step #2. As shown in FIG. 6, in step #2, a search is made from pixel Q of interest located within the area of the measurement window W. The search directions are four and include an X direction, a Y direction, and directions that form ±45° with reference to the X and Y directions.

On the basis of the results of the search made in the four directions, the edge direction recognizing means 20 detects a search direction in which an edge pair is detectable, and recognizes a direction orthogonal to that search direction as the edge direction of the design pattern P.

To be more specific, the edge direction recognizing means 20 makes the search in the X direction, as shown in FIG. 7. When pixels G1 and G2 are detected at the edge points which are at the ends of the design pattern P, these pixels G1 and G2 are detected as an edge pair.

The edge direction recognizing means 20 recognizes the direction (Y direction) orthogonal to the search direction (X direction) as the edge direction of the design pattern P.

Then, the size measurement means 15 executes step #3. In this step, the size measurement means 15 detects edge points which are at the ends of the design pattern P. The edge points are detected as sub-pixels on the basis of the pixel values of the edge pair detected by the edge direction recognizing means 20. The size measurement means 15 calculates the widthwise dimension Rd of the design pattern P on the basis of the edge points.

As shown in FIGS. 6 and 8, the profile acquiring means 21 obtains a profile showing how pixel values are distributed in the width direction of the design pattern P. The pixel values correspond to the edge portion whose edge direction is recognized.

The edge point-detecting means 22 detects edge points as sub-pixels, using a predetermined threshold value with respect to the profile obtained by the profile acquiring means.

If, as shown in FIG. 6, the profile is processed using threshold value "th", and the sub-pixel is located between the pixels G5 and G6 of the adjacent edge pairs, then the sub-pixel is calculated on the basis of formula (1).

To detect the size in the X and Y directions, the edge direction recognizing means uses templates, which are combinations of different edge direction patterns, such as those shown in FIGS. 10A to 10C, FIGS. 11A and 11B, FIGS. 12A to 12C, FIGS. 13A to 13F and FIGS. 14A to 14C.

As shown in FIG. 6, the edge detection uses threshold value "th." In connection with this edge direction, the two cases shown in FIG. 8 have to be taken into account: one is case 1 where the brightness of pixel G7 is equal to the threshold value "th", and the other is case 2 where threshold value "th" is between the brightnesses of pixels G8 and G9.

The first widthwise dimension means 23 calculates the widthwise dimension Rd of the design pattern P on the basis of the edge points detected by the edge point-detecting means 22.

The second widthwise dimension means 24 is supplied with under-inspection pattern data Ds from the image processing circuit.

Then, the second widthwise dimension means 24 examines the under-inspection pattern data Ds and recognizes the same position as the pixels of the edge pair which the edge direction recognizing means 20 detects on the design pattern data Df.

Subsequently, the second widthwise dimension means 24 calculates the widthwise dimension Sd of the under-inspection pattern Ds at the same position as the pixels of the edge pair detected on the design pattern data Df.

Then, the dimensional error determining means 16 executes step #4. In this step, the quality of a semiconductor wafer circuit pattern is determined on the basis of the widthwise dimension Rd of the design pattern P calculated by the size measurement means 15 and the widthwise dimension Sd of the pattern under inspection.

To be more specific, the dimensional error calculating means 25 calculates a dimensional error "err" on the basis of the difference between the widthwise dimension Rd of the design pattern P and the widthwise dimension Sd of the pattern under inspection, by using formula (2).

Then, the determination means 26 checks if a value obtained by adding an offset value to the dimensional error "err" is out of an allowable range, i.e., if that value is greater than the upper limit or smaller than the lower limit. If this is the case, the determination means 26 determines that the semiconductor wafer circuit pattern is abnormal.

Figure 20:
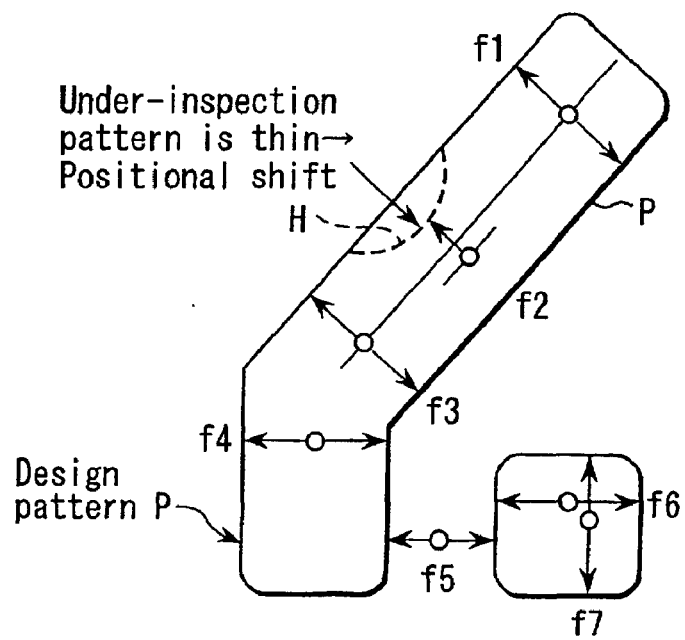
FIG. 20 shows a design pattern and a dented circuit pattern that are handled by the size checking apparatus of the first embodiment of the present invention.

FIG. 20 shows size measurement positions f1 to f7 of a design pattern P and how a circuit pattern is shaped at positions corresponding to positions f1 to f7. In the example shown in FIG. 20, the circuit pattern has a dent H.

In this case, the dimensional error determining means 16 compares the widthwise dimension Rd of the design pattern P with the widthwise dimension Sd of the pattern under inspection and detects a dimensional error "err" at the dented portion H.

The dimensional error determining means 16 determines a pattern abnormality in this case since the value obtained by adding an offset value to the dimensional error "err" is out of an allowable range, i.e., that value is greater than the upper limit or smaller than the lower limit.

In step #5, the threshold value-varying means 17 prepares a frequency distribution of the dimensional error "err", and varies or determines the threshold value or offset value on the basis of that frequency distribution.

To be more specific, the frequency distribution preparing means 27 prepares a frequency distribution of dimensional errors "err" in the manner shown in FIG. 17.

Then, the varying/setting means 28 obtains data on shape error E of the design pattern 13 on the basis of the frequency distribution of dimensional errors "err" prepared by the frequency distribution preparing means 27. Depending upon the color (black or white) of the background, the pattern under inspection may decrease in shape, and the data to be processed may become non-linear. Since shape error E may vary accordingly, a plurality of offset values are determined in accordance with the background.

The varying/setting means 28 examines variations corresponding to the line width of the circuit pattern on the basis of the frequency distribution of dimensional errors "err" shown in FIG. 17. In consideration of the results of the examination, the varying/setting means 28 determines threshold values in accordance with the size of the design pattern P, as shown in FIG. 18.

By varying the threshold or offset value, an error which the design pattern data Df may undergo in the arithmetic process of the data expansion circuit 11 is corrected.

As can be seen from FIG. 18, a threshold value or an offset value can be determined in accordance with the size (the pattern width) of the design pattern P.

Although the positional shift may differ, depending upon the black or white background of the design pattern P represented by the design pattern data Df, a threshold value or an offset value can be determined in accordance with the level of that background.

In the first embodiment described above, a pair of edges that are located at ends as viewed in the widthwise direction of the design pattern P are recognized in consideration of the edge direction of that design pattern P. Edge points located at positions where the paired edges are recognized are detected as sub-pixels. The widthwise dimension Rd of the design pattern P is calculated on the basis of the edge points. In addition, on the under-inspection pattern data Ds acquired by the imaging operation by the exposure apparatus 1, the widthwise dimension Sd of the circuit pattern Ds represented by the under-inspection pattern data Ds is calculated at the same position as the pixels of the edge pair detected on the design pattern data Df. On the basis of the widthwise dimension Rd of the design pattern P and the widthwise dimension Sd of the circuit pattern, the semiconductor wafer circuit pattern is checked. By following these procedures, the finished size (CD) of the semiconductor wafer circuit pattern can be checked with high accuracy.

The threshold value-varying means 17 varies or determines the threshold or offset value on the basis of the frequency distribution prepared from the dimensional error "err" of the design pattern P. This feature enables accurate inspection of the size of a pattern under inspection (such as a semiconductor wafer circuit pattern). The accurate inspection is ensured even if shape error E is caused in the circuit pattern in the process of generating design data from the design database, which stores data on semiconductor wafer circuit patterns, or if shape error E is caused due to the black and white difference of the pattern under inspection.

As can be seen from the above, the exposure processing using the inspected mask 2 enables miniaturized semiconductor device circuit patterns to be formed on a semiconductor wafer.

The second embodiment of the present invention will now be described.

According to the second embodiment, the pattern recognition means 14 of the first embodiment shown in FIG. 1 is modified to have a different function. In the description below, therefore, reference will be made to the differences that differentiate the second embodiment from the first embodiment.

As shown in FIG. 4, the pattern recognition means 14 of the second embodiment includes a scanning means 18, a search means 19 and an edge direction recognizing means 20. Of these three, the scanning means 18 is similar to that of the first embodiment.

Figure 21:
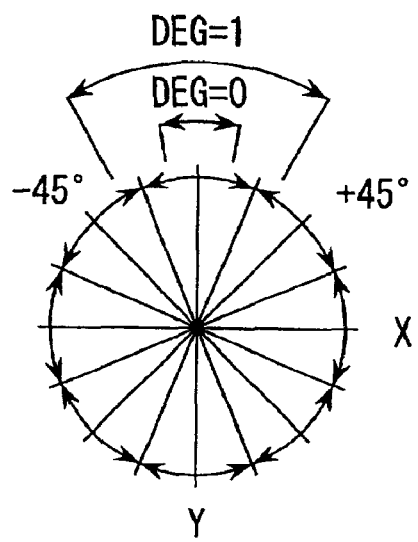
FIG. 21 is a schematic diagram showing search directions used by a size checking apparatus according to the second embodiment of the present invention.
Figure 22A:
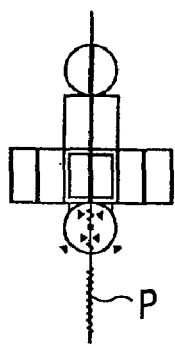
FIG. 22A is a schematic diagram showing a template of a combination of edge pairs used in a size checking apparatus according to the second embodiment of the present invention.
Figure 22B:
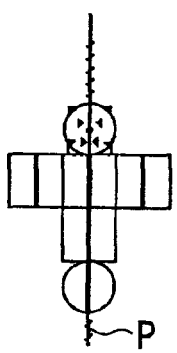
FIG. 22B is a schematic diagram showing a template of a combination of edge pairs used in the size checking apparatus according to the second embodiment of the present invention.
Figure 22C:
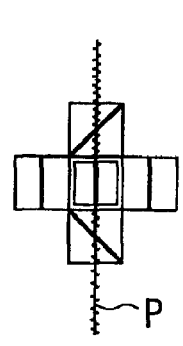
FIG. 22C is a schematic diagram showing a template of a combination of edge pairs used in the size checking apparatus according to the second embodiment of the present invention.
Figure 22D:
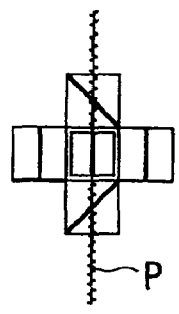
FIG. 22D is a schematic diagram showing a template is of a combination of edge pairs used in the size checking apparatus according to the second embodiment of the present invention.
Figure 23A:
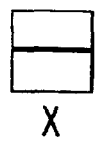
FIG. 23A is a schematic diagram showing the edge direction of one pixel of a template used in the size checking apparatus of the second embodiment of the present invention.
Figure 23B:
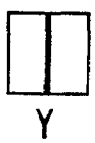
FIG. 23B is a schematic diagram showing the edge direction of one pixel of a template used in the size checking apparatus of the second embodiment of the present invention.
Figure 23C:
FIG. 23C is a schematic diagram showing the edge direction of one pixel of a template used in the size checking apparatus of the second embodiment of the present invention.
Figure 23D:
FIG. 23D is a schematic diagram showing the edge direction of one pixel of a template used in the size checking apparatus of the second embodiment of the present invention.
Figure 23E:
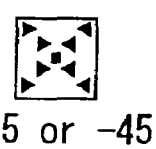
FIG. 23E is a schematic diagram showing the edge direction of one pixel of a template used in the size checking apparatus of the second embodiment of the present invention.
Figure 23F:
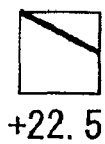
FIG. 23F is a schematic diagram showing the edge direction of one pixel of a template used in the size checking apparatus of the second embodiment of the present invention.
Figure 23G:
FIG. 23G is a schematic diagram showing the Hedge direction of one pixel of a template used in the size checking apparatus of the second embodiment of the present invention.
Figure 23H:
FIG. 23H is a schematic diagram showing the edge direction of one pixel of a template used in the size checking apparatus of the second embodiment of the present invention.
Figure 23I:
FIG. 23I is a schematic diagram showing the edge direction of one pixel of a template used in the size checking apparatus of the second embodiment of the present invention.

As shown in FIG. 21, the search means 19 has a function of making a search in different directions from a pixel Q of interest which is located inside an area of the measurement window. The different directions include an X direction, a Y direction orthogonal to the X direction, directions which form angles of ±45° with reference to the X and Y directions, and four directions of bisectors between each of these directions and the X and Y directions.

On the basis of the results of a search made in the eight directions, the edge direction recognition means 20 detects a search direction in which an edge pair is detectable. The edge direction recognition means 20 recognizes that an edge of the design pattern extends in the direction orthogonal to the search direction.

By approximation, the edge direction recognizing means 20 determines that a given direction belongs to one of the X direction, the Y direction and directions which form ±45° with reference to the X and Y directions.

For example, if a given direction is within ±11.25° of the Y direction (DEG=0), it is regarded as being equal to the Y direction.

On the other hand, if the given direction is outside the above range and within ±33.75° of the Y direction (DEG=1), then this direction is regarded as being equal to one of the directions that form ±45° with reference to the X or Y direction.

The edge direction recognizing means 20 detects an edge pair as below.

FIGS. 22A–22D show templates regarding a combination of edge pairs used when the scan direction is the X direction. According to these templates, pixels contained in a region of 5×5 pixels and satisfying "edge direction" conditions, are regarded as an edge pair. The "P" represents a design pattern direction.

As shown in FIGS. 23A to 23I, each of the pixels of the templates represents one of the following: the "X direction", the "Y direction", the "+45° direction", the "−45° direction", the "+45 or −45° direction", the "+22.5° direction", the "+67.5 direction", the "−67.5 direction" and the "−22.5° direction."

FIGS. 24A–24C show templates regarding a combination of edge pairs used when the scan direction is +45°.

In step #1, the scanning means 18 scans the measurement window W across the design pattern data Df in scan direction a, as shown in FIG. 5. The scan position is shifted in b direction, thereby scanning the entirety of the design pattern data Df.

Next, the search means 19 executes step #2. In step #2, a search is made from pixel Q of interest located within the area of the measurement window W. As shown in FIG. 21, the search directions are eight and include an X direction, a Y direction, directions that form ±45° with reference to the X and Y directions, and four directions of bisectors between each of these directions and the X and Y directions.

On the basis of the results of the search made in the eight directions, the edge direction recognizing means 20 detects a search direction in which an edge pair is detectable, using the templates shown in FIGS. 23A to 23I or the templates shown in FIGS. 24A to 24C. The edge direction recognizing means 20 recognizes a direction orthogonal to that search direction as the edge direction of the design pattern P.

Thereafter, operations similar to those of the first embodiment are executed. That is, edge points located at positions where the paired edges are recognized are detected as sub-pixels. The widthwise dimension Rd of the design pattern P is calculated on the basis of the edge points. In addition, on the under-inspection pattern data Ds acquired by the imaging operation by the exposure apparatus 1, the widthwise dimension Sd of the circuit pattern represented by the under-inspection pattern data Ds is calculated at the same position as the pixels of the edge pair detected on the design pattern data Df. On the basis of the widthwise dimension Rd of the design pattern P and the widthwise dimension Sd of the circuit pattern, the semiconductor wafer circuit pattern is checked.

As can be seen from the above, the second embodiment has advantages similar to those of the first embodiment. In addition to this, the second embodiment enables recognition of an edge direction of a miniaturized circuit pattern, as can be seen from FIG. 25. Since the circuit patterns on recent semiconductor wafers are very fine, the present invention can be advantageously applied to the inspection of such fine circuit patterns.

The present invention is not limited to the first and second embodiments described above, and may be modified in the manner set forth below.

In the above embodiments, a plurality of threshold values are prepared. Since these threshold values vary in accordance with the black or white color of the background, the pattern direction or the angle of this direction, the variations of the threshold may be individually prepared beforehand.

The central positions of the pattern under inspection and the design pattern P can be calculated on the basis of the widthwise dimensions Sd and Rd of the patterns. By this calculation, shape error E, which may occur in the process of generating design pattern P from design database, can be detected on the basis of the frequency distribution shown in FIG. 17. Hence, the function of inspecting defects in a circuit pattern formed on a mask 2 is attained with improved reliability.

The inspection need not be based on the comparison between the design pattern data Df, which is obtained by acquiring data on the projection image of the mask 2, and the under-inspection pattern data. That is, the inspection may be based on the size comparison between circuit patterns formed on adjacent dies. This alternative method ensures high accuracy.

The detection of the pattern direction of an edge need not be limited to the search made in four or eight directions. The search direction may be arbitrarily determined for enhancing the search accuracy.

Templates increased in size may be used for the recognition of an edge pair. The use of such templates improves the degree of freedom in matching.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A size checking method comprising:
   a first step of reading image data on a reference pattern and recognizing an edge direction of the reference pattern on the basis of pixel values detected at edge portions which are end portions as viewed in a width direction of the reference pattern;
   a second step of detecting edge points corresponding to the end portions as sub-pixels on the basis of the pixel values detected at the edge portions, and calculating a widthwise dimension of the reference pattern from the edge points;
   a third step of acquiring image data on a pattern under inspection;
   a fourth step of detecting edge points at each of edge portions which are end portions as viewed in a width direction of the pattern under inspection, said edge points of the pattern under inspection being detected with respect to edge portions located at the same position as the edge portions whose widthwise dimension is calculated by use of the reference pattern, and of calculating the widthwise dimension of the pattern under inspection, said edge points of the pattern under inspection as starting points;
   a fifth step of determining whether or not the pattern under inspection is defective on the basis of the widthwise dimension of the reference pattern and the widthwise dimension of the pattern under inspection;

a sixth step of preparing a frequency distribution with respect to a dimensional error obtained on the basis of the widthwise dimension of the reference pattern and the widthwise dimension of the pattern under inspection, and varying a threshold value used in the second step when the edge points are detected as sub-pixels;

said fifth step including, calculating a dimensional error on the basis of the difference between the widthwise dimension of the pattern under inspection and the widthwise dimension of the reference pattern, and determining an abnormal state when a value obtained by adding an offset value to the dimensional error is out of an allowable range; and said sixth step including, preparing a frequency distribution with respect to the dimensional error, which is based on both the widthwise dimension of the pattern under inspection and the widthwise dimension of the reference pattern, and varying the offset value or a threshold value which is that of either the reference pattern or the pattern under inspection, and which used in the second step when the edge points are detected as sub-pixels, on the basis of the frequency distribution.

2. A size checking method according to claim 1, wherein said first step includes:

scanning a measurement window across the reference pattern;

making a search in different directions from a pixel of interest which is located inside an area of the measurement window; and examining edge directions in the vicinity of the edge portions of the reference pattern on the basis of the directions in which the search is carried out, and recognizing an edge pair when templates of edge direction patterns show that the edge directions oppose each other, the edge pair being used for detecting a vertically extending pattern.

3. A size checking method comprising:

acquiring a reference pattern by performing an operation on the basis of design data on a semiconductor wafer circuit pattern;

scanning a measurement window across image data on the reference pattern;

making a search in different directions from a pixel of interest which is located inside an area of the measurement window, said different directions being an X direction, a Y direction orthogonal to the X direction, directions which form angles of ±45° with reference to the X and Y directions;

detecting a search direction in which a pair of pixels are detected, on the basis of results of the search, and recognizing a direction orthogonal to the search direction as an edge direction of the reference pattern;

preparing a profile showing how pixel values are distributed in a width direction of the reference pattern, the pixel values corresponding to a pair of pixels whose edge direction is recognized;

detecting edge points corresponding to ends of the reference pattern as sub-pixels using a predetermined threshold value with respect to the profile;

calculating a widthwise dimension of the reference pattern from the edge points;

acquiring image data on a pattern under inspection, the pattern being a semiconductor wafer circuit pattern formed on a mask used by an exposure apparatus;

calculating a widthwise dimension of the pattern under inspection at the same position as a pair of pixels whose widthwise dimension is calculated by use of the reference pattern;

calculating a dimensional error on the basis of the difference between the widthwise dimension of the pattern under inspection and the widthwise dimension of the reference pattern;

determining an abnormal state when a value obtained by adding an offset value to the dimensional error is out of an allowable range;

preparing a frequency distribution with respect to the dimensional error; and varying the offset value or a threshold value which is that of either the reference pattern or the pattern under inspection, on the basis of the frequency distribution.

4. A size checking apparatus comprising:

pattern recognition means for reading image data on a reference pattern and recognizing an edge direction of the reference pattern on the basis of pixel values detected at edge portions which are end portions as viewed in a width direction of the reference pattern;

first size-measuring means for detecting edge points corresponding to the end portions as sub-pixels on the basis of the pixel values detected at the edge portions, and for calculating a widthwise dimension of the reference pattern, from the edge points as starting points;

means for acquiring image data on the pattern under inspection;

second size-measuring means for reading the image data on the pattern under inspection and for calculating a widthwise dimension of the pattern under inspection, from edge portions located at the same position as the edge portion whose widthwise dimension is calculated by use of the reference pattern; and means for determining whether or not the pattern under inspection is defective on the basis of the widthwise dimension of the reference pattern and the widthwise dimension of the pattern under inspection;

threshold value-varying means for preparing a frequency distribution with respect to a dimensional error of the reference pattern and for varying a threshold value which the first size-measuring means uses when the edge points are detected as sub-pixels, on the basis of the frequency distribution, dimensional error determination means comprising, means for calculating the dimensional error on the basis of the difference between the widthwise dimension of the pattern under inspection and the widthwise dimension of the reference pattern; and means for determining an abnormal state when a value obtained by adding an offset value to the dimensional error is out of an allowable range.

5. A size checking apparatus comprising:

data expansion means for acquiring a reference pattern by performing an operation on the basis of design data on a semiconductor wafer circuit pattern;

scanning means for scanning a measurement window across image data on the reference pattern;

search means for making a search in different directions from a pixel of interest which is located inside an area of the measurement window, said different directions being an X direction, a Y direction orthogonal to the X direction, directions which form angles of ±45° with reference to the X and Y directions; and edge direction recognition means for detecting a search direction in which a pair of pixels are detected, on the basis of results of the search, and for recognizing a direction orthogonal to the search direction as the edge direction;

profile acquiring means for preparing a profile showing how pixel values are distributed in a width direction of the reference pattern, the pixel values corresponding to the edge portion whose edge direction is recognized;

edge point-detecting means for detecting edge points corresponding to end portions of the reference pattern as sub-pixels using a predetermined threshold value with respect to the profile;

first widthwise dimension means for calculating a widthwise dimension of the reference pattern on the basis of the edge points;

an exposure apparatus having a mask on which a semiconductor wafer circuit pattern is formed;

imaging means for imaging a mask image projected by the exposure apparatus;

image processing means for deriving image data on a pattern under inspection, from image signals output from the imaging means;

second widthwise dimension means for receiving the image data acquired by the image processing means and for calculating a widthwise dimension of the pattern under inspection, at the same position as a pair of pixels detected by the edge direction recognition means;

dimensional error calculating means for calculating a dimensional error on the basis of the difference between the widthwise dimension of the pattern under inspection and the widthwise dimension of the reference pattern;

determination means for determining an abnormal state when a value obtained by adding an offset value to the dimensional error is out of an allowable range;

frequency distribution-preparing means for preparing a frequency distribution with respect to the dimensional error; and varying means for varying the offset value or threshold value which is that of either the reference pattern or the pattern under inspection, on the basis of the frequency distribution.

* * * * *